United States Patent

Rössler et al.

[11] 3,837,237
[45] Sept. 24, 1974

[54] MULTI-SPEED CHANGE-SPEED TRANSMISSIONS FOR MOTOR VEHICLES

[75] Inventors: Heinrich Rössler, Baden-Baden; Wilhelm Körner, Gernsbach-Staufenberg; Rudolf Voshage, Gernsbach; Jürgen Wendeborn, Gaggenau; Friedrich Fortenbacher, Obertsrot, all of Germany

[73] Assignee: Daimler-Benz Aktiengesellschaft, Stuttgart-Unterturkheim, Germany

[22] Filed: Oct. 12, 1972

[21] Appl. No.: 296,776

[30] Foreign Application Priority Data
Oct. 12, 1971 Germany............................ 2150674

[52] U.S. Cl. ............................... 74/740, 74/665 T
[51] Int. Cl. ....................... F16h 37/06, F16h 37/10
[58] Field of Search.......... 74/665 T, 740; 192/3.51

[56] References Cited
UNITED STATES PATENTS
3,354,745  11/1967  De Castelet................... 74/665 GA
3,470,766  10/1969  Magg et al. ...................... 74/665 T Primary Examiner—Samuel Scott
Assistant Examiner—P. S. Lall
Attorney, Agent, or Firm—Craig & Antonelli

[57] ABSTRACT

A multi-speed transmission for motor vehicles, especially for tractors or similar commercial vehicles, which includes a main transmission and a distributor transmission driving the axles; the transmission is thereby so arranged that the distributor transmission is disposed at least approximately in the vehicle center and the main transmission is located on the side of the distributor transmission opposite the driving engine while an auxiliary transmission for crawling and snail speeds is adapted to be subsequently installed on the side of the distributor transmission facing the driving engine.

34 Claims, 3 Drawing Figures

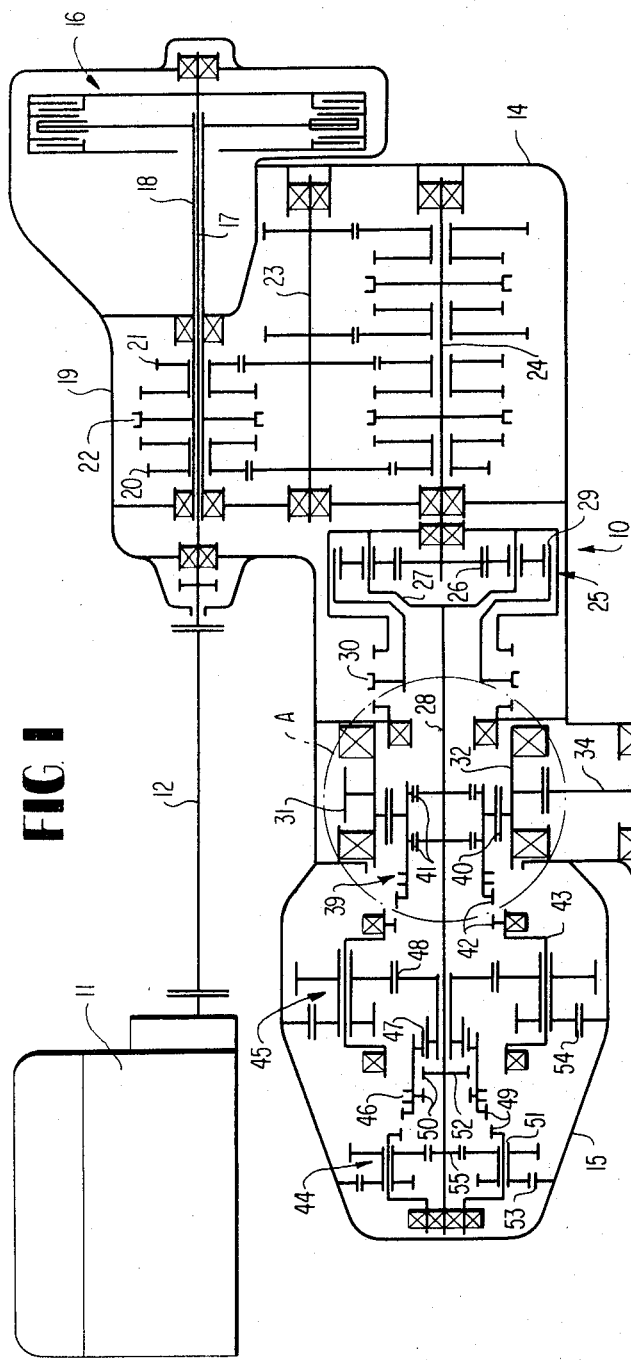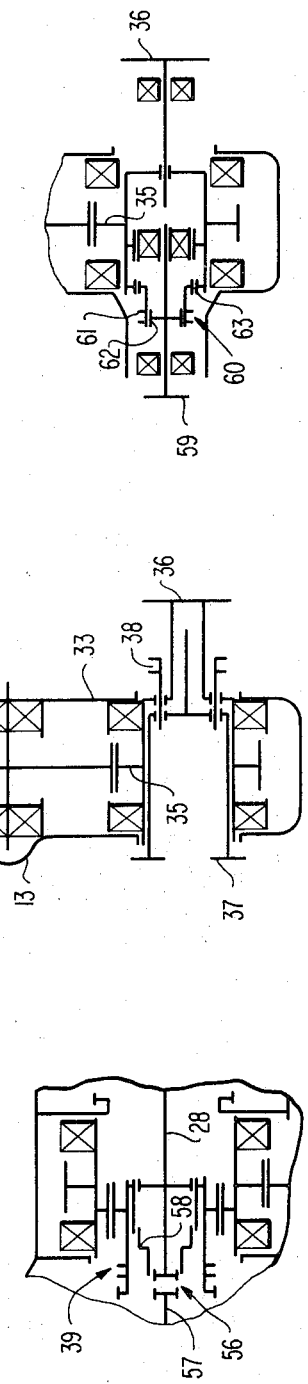

MULTI-SPEED CHANGE-SPEED TRANSMISSIONS FOR MOTOR VEHICLES

The present invention relates to a multi-speed transmission for motor vehicles, especially for tractors or similar commercial vehicles, consisting of a main transmission and of a distributor transmission driving the axles.

Transmissions are known in the prior art for tractors or similar commercial types of vehicles which exhibit a considerably increased number of speeds compared to the customary motor vehicle transmissions and which are consequently designated as multi-speed transmissions. The present invention is now concerned with the task to provide such a multi-speed transmission which with the use of essentially identically constructed components can be adapted to several vehicle types and can be further expanded correspondingly by auxiliary transmissions.

The underlying problems are solved with the transmissions of the aforementioned type by such an arrangement in the vehicle that the distributor transmission is located at least approximately in the vehicle center and the main transmission is located on the side of the distributor transmission opposite the driving engine and in that an auxiliary transmission for crawling and snail speeds adapted to be installed subsequently is arranged on the side of the distributor transmission facing the driving engine.

The construction according to the present invention offers the advantage that this transmission arranged centrally in the vehicle can be equipped as desired with additional or auxiliary transmissions and thus can be used for several vehicle types. The auxiliary or additional transmissions may also be installed subsequently. Additionally, a very balanced and compensated position of the center of gravity results from the described arrangement.

In one embodiment of the present invention, the distributor transmission serves as central oil sump for the main transmission and for any possibly present auxiliary transmission. Additionally, it is proposed that the main clutch is arranged freely accessible on the side of the main transmission opposite the distributor housing. A structural simplification of the entire transmission results in this manner by the combination of the oil supply in the distributor transmission. Additionally, the clutch is accessible without difficulty and without disassembly of transmission parts. It can be very readily exchanged or can be replaced according to the present invention also by a conventional load-shifting reversing clutch, i.e., a friction disk clutch which practically consists of two clutches, namely one for the forward direction of rotation and one for the reverse direction of rotation, with the corresponding transmission ratios remaining constantly in engagement and being effectively connected-in by a respective clutch. It is thereby within the scope of the present invention that the clutch is arranged either in its own housing or in the housing of the main transmission.

A further feature of the present invention resides in that the input shaft of the main transmission which is connected with the main clutch is constructed as hollow shaft and the drive shaft connecting the engine with the main clutch extends through this hollow shaft, and in that again two loose gear wheels are supported on the input shaft adapted to be clutched thereto and in that the first one of these gears serves for the forward drive and the second one for the reverse drive. The hollow shaft may thereby be supported in the housing or on the drive shaft.

According to the present invention, a shiftable planetary gear set is coordinated to the main transmission which serves as group transmission and is aligned with the output shaft of the main transmission; the output shaft of the shiftable planetary gear set serves as input shaft of the distributor transmission or is connected with the same. A further proposal of the present invention is to the effect that the input shaft of the auxiliary transmission is detachably connected with the input shaft of the distributor transmission which can take place, for example, by a flanged connection.

The construction further takes place according to the present invention in such a manner that the input gear wheel of the distributor transmission is rigidly arranged on a hollow shaft and that this hollow shaft is adapted to be selectively coupled with the input shaft of the distributor transmission or with the output shaft of the auxiliary transmission. In detail, it is proposed therefor that a slip gear or sliding-tooth-clutch of conventional construction is arranged in the distributor transmission between the hollow shaft and the input shaft which, on the one hand, is connected in both of its shifting positions continuously with the hollow shaft and, on the other, is connected in one shifting position with the input shaft of the distributor transmission and in the other shifting position with the output of the auxiliary transmission. A further possibility resides according to the present invention in that the input shaft of the auxiliary transmission is adapted to be coupled with the input shaft of the distributor transmission by means of a shifting sleeve which is coordinated to the slip gear or sliding-tooth-clutch in sequential actuation, i.e., both shifting elements are axially displaceable in unison though rotatable relative to one another. The auxiliary transmission includes according to the present invention one or several further speed reductions to a lower speed so that so-called crawling or snail speeds result therefrom. These transmission ratios may appropriately be constructed as and constituted by shiftable planetary gear sets.

For the case that a branch connection adapted to be uncoupled and a fixedly interconnected branch are provided in the distributor housing at the output, it is proposed according to the present invention that these branches are so constructed that the actuation of the clutch of the branch connection adapted to be uncoupled is to be actuated either from one or the other side of the distributor transmission. This takes place appropriately in such a manner that the entire structural output unit of the distributor transmission is reversible. If this is not desired, it is proposed that the clutch for the branch adapted to be uncoupled is disposed at the front side of the distributor housing and is actuatable from that side.

Accordingly, it is an object of the present invention to provide a multi-speed transmission for motor vehicles, especially for tractors or similar commercial vehicles, which avoids by simple means the aforementioned drawbacks and shortcomings encountered in the prior art.

Another object of the present invention resides in a multi-speed transmission for motor vehicles, especially for tractors or similar commercial vehicles, which can be readily adapted to several types of vehicles by the use of components of essentially identical construction and which can be further readily expanded by auxiliary transmissions.

A further object of the present invention resides in a multi-speed transmission for motor vehicles of the type described above which not only can be readily adapted to different types of vehicles but also offers a very balanced location of the center of gravity of the entire drive unit.

A still further object of the present invention resides in a multi-speed transmission for motor vehicles, especially tractors or similar commercial vehicles, which can be expanded readily by the use of auxiliary transmissions that can also be installed subsequently, if so desired.

Another object of the present invention resides in a multi-speed transmission for motor vehicles which offers a structural simplification of the entire transmission and a simple servicing of the various parts, particularly of the main clutch without the need for disassembly of transmission parts.

Still another object of the present invention resides in a multi-speed, change-speed transmission of the type described above which is relatively simple in construction and offers great versatility.

These and further objects, features and advantages of the present invention will become more apparent from the following description when taken in connection with the accompanying drawing which shows, for purposes of illustration only, several embodiments in accordance with the present invention, and wherein:

FIG. 1 is a schematic view of one embodiment of a multi-speed transmission in accordance with the present invention;

FIG. 2 is a partial schematic view of another embodiment of the transmission in accordance with the present invention to be installed at the location A in FIG. 1; and FIG. 3 is a partial schematic view of a further embodiment of the output unit for the multi-speed transmission in accordance with the present invention.

Referring now to the drawing wherein like reference numerals are used throughout the various views to designate like parts, and more particularly to FIG. 1, according to this figure, the over-all transmission generally designated by reference numeral 10 is driven by the engine 11 only schematically indicated by way of an intermediate shaft 12—which may be a joint shaft of conventional type. The over-all transmission 10 consists of a distributor transmission 13, of a main transmission 14 and of an auxiliary transmission 15 also adapted to be installed subsequently. The arrangement is thereby made in such a manner that the distributor transmission 13 is disposed approximately in the vehicle center. The main transmission 14 is disposed adjacent to the distributor transmission 13 on the side thereof opposite the engine 11, while the auxiliary transmission 15 is arranged on the opposite side of the distributor transmission 13, i.e., on the side thereof facing the engine 11.

The main transmission 14 includes the main clutch generally designated by reference numeral 16 which is arranged on the free side of the main transmission 14 opposite the distributor transmission 13 either in its own housing or in the housing of the main transmission 14 itself. Hence, the main clutch 16 is readily accessible from this side and can be serviced, exchanged and eventually also replaced by another type of clutch from the free side thereof without any further work at the main transmission itself.

The drive of the main clutch 16 takes place by way of a shaft 17 which is connected with the intermediate shaft 12. Concentric about the shaft 17 is a hollow shaft 18 which forms the input shaft of the main transmission 14 and is operatively connected with the clutch 16. The hollow shaft 18 is supported in the housing 19 of the main transmission 14 by appropriate bearing means. Two loose drive gears 20 and 21 are arranged on the hollow shaft 18 which are adapted to be connected with the hollow shaft 18 in a conventional manner by a clutch 22 disposed therebetween. The gear 20 thereby serves for the forward drive whereas the gear 21 serves for the reverse drive by means of a reversing gear (not shown). These gear wheels 20 and 21 may be identical with the loose gear wheels for the fourth and the eighth speed of the main transmission.

Furthermore, an intermediate shaft 23 and an output shaft 24 are arranged in the main transmission 14, on which are supported the gears for the individual transmission speeds or transmission ratios which form no part of the present invention and are therefore not illustrated and described in detail. In the instant case, the main transmission 14 has four speeds which can be driven both in the forward direction as also in the reverse direction. The construction and the number of speeds of the main transmission 14 itself takes place in a conventional manner and forms no part of the present invention.

A planetary gear set generally designated by reference numeral 25 is arranged aligned with the output shaft 24 of the main transmission 14 which planetary gear set serves as a group gear. The planetary gear set 25 is driven by the sun gear 26 fixedly arranged on the output shaft 24 whereas the planet gear carrier 27 serves as output. For that purpose, it is connected with the input shaft 28 of the distributor transmission 13. The ring gear 29 of the planetary gear set 25 can be connected by means of a clutch 30 either as reaction member with the housing of the main transmission 14 (speed reduction) or with the planet gear carrier 27 (locked planetary gear set).

The input gear 31 of the distributor transmission 13 is supported on a hollow shaft 32 within the housing 33 of the distributor transmission 13. It drives by way of an intermediate gear 34 the output gear 35 of the distributor transmission 13, which on the one hand, is rigidly connected with an output drive 36 for rotation in unison therewith that leads, for example, to the rear axle. A further output drive 37 which leads, for example, to the front axle is adapted to be engaged by a clutch 38 with the first output drive 36 (all wheel drive). The clutch 38 or the entire output structural unit of the distributor transmission 13 is so constructed that the clutch 38 can be actuated either from the one or the other side of the distributor transmission 13.

The input shaft 28 of the distributor transmission 13 is operatively connected with the input of the auxiliary transmission 15 which can take place, for example, by a flanged connection (not shown). In the illustrated embodiment, the input shaft 28 is extended up to into the auxiliary transmission 15 so that it serves itself at the same time as input for the auxiliary transmission 15. Consequently, a slip-gear or sliding tooth clutch 39 is arranged between this input shaft 28 and the hollow shaft 32 of the distributor transmission 13. This slip-gear or sliding-tooth-clutch 39 is in continuous connection with the hollow shaft 32 by a correspondingly long sliding toothed means 40. The clutch 39, on the other hand, is operatively connected by narrow sliding toothed means 41 in the illustrated shifting position with the input shaft 28. In this shifting position, the auxiliary transmission 15 is therefore disengaged and the drive takes place from the input shaft 28, corresponding to the speed or transmission ratio selected in the main transmission 14, directly by way of the hollow shaft 32 to the input gear 31 of the distributor transmission 13 and therewith to the fixedly connected output 36 thereof or, with an engaged clutch 38, also to the second output 37 thereof.

The sliding-tooth-clutch 39 includes further narrow sliding toothed means 42, by means of which it is connected in its second shifting position with the output of the auxiliary transmission 15. In the second shifting position, the teeth 41 are therefore disengaged. The drive then takes place from the input shaft 28 by way of the auxiliary transmission 15 and from the output 43 thereof by way of the clutch teeth 42 to the hollow shaft 32 of the distributor transmission 13. In this shifting position, the speed selected in the auxiliary transmission 15 is therefore engaged so that a further speed reduction lies between the main transmission 14 and the distributor transmission 13 which can be engaged in all speeds of the main transmission 14.

Two planetary gear sets generally designated by reference numerals 44 and 45 are arranged in the auxiliary transmission 15 which can be selectively engaged by a clutch 46. The clutch 46 is constructed in a similar manner as the sliding-toothed-clutch 39 in the distributor transmission 13. This means it is, on the one hand, in constant operative connection with input gear 48 of the planetary gear set 45 constructed as sun gear by way of long sliding toothed means 47. On the other hand, it can be connected by a relatively narrowly constructed teeth 49 or 50 either with the carrier 51 of the planetary gear set 44 serving as output or with the input gear 52 secured on the input shaft 28. Both planetary gear sets 44 and 45 are so constructed that the carriers 51 and 43 serve as outputs and the ring gears 53 and 54 serving as reaction members are arranged fixedly at the housing.

In the illustrated position, the clutch 46 is in its neutral position, i.e., the auxiliary transmission 15 is disengaged. The drive takes place from the shaft 28 in the manner already described directly to the input gear 31 of the distributor transmission 13. If the clutch 46 is displaced toward the left into its first clutch position and thereby the sliding-tooth-clutch 39 is at the same time shifted also toward the left, then the drive takes place from the input shaft 28 by way of the gear 55 arranged thereon to the planetary gear set 44 and from the carrier 51 thereof by way of the clutch 46 and from the carrier 43 thereof then by way of the sliding-tooth-clutch 39 to the input gear 31 of the distributor transmission 13. In this first shifting position, all speeds of the main transmission can again be used with the thus-engaged speed of the auxiliary transmission 15.

If the clutch 46 in the auxiliary transmission 15 is displaced toward the right into its second shifting position, then the planetary gear set 44 is disengaged and the drive takes place from the gear 52 secured on the input shaft 28 directly to the sun gear 48 of the second planetary gear set 45 and from there in the described manner to the input gear 31 of the distributor transmission 13. Also, in this shifting position, all speeds of the main transmission 14 can again be used with the thus-engaged speed of the auxiliary transmission.

The auxiliary transmission 15 is—as already indicated—constructed as a structural unit adapted to be installed subsequently. It may therefore be flangedly connected or not to the distributor transmission 13 as desired, whereby, of course, the input shaft 28—as already indicated—has to be separated. Also, a subsequent installation of the auxiliary transmission 15 is possible. In case that the auxiliary transmission 15 is not present, the sliding-tooth-clutch 39 is of course fixed in the illustrated position.

According to FIG. 2, the input shaft 28 of the distributor transmission 13 is connected by way of a shifting clutch generally designated by reference numeral 56 with the input shaft 57 of the auxiliary transmission 15 which itself may be constructed in the manner already described. The shifting clutch 56 is actuated by a separate shifting sleeve 58 which is so coordinated to the sliding-tooth-clutch 39 that it is axially actuatable together with the latter (sequential actuation) but can rotate with respect thereto.

According to FIG. 3, the fixedly connected, rearwardly extending output drive 36 is coordinated to the output gear 35 of the distributor transmission 13. The forwardly extending output 59 is adapted to be engaged by means of a clutch 60 which is to be actuated from in front. It consists of a shifting sleeve 61 which is provided with sliding toothed means and cooperates with corresponding teeth 62 and 63 at both outputs 36 and 59.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A multi-speed transmission arrangement for motor vehicles having a driving engine and driving vehicle axle means, the motor vehicle having a longitudinal center plane and a transverse center plane, the arrangement comprising: a main transmission means, means for operatively connecting said main transmission means with the driving engine, a distributor transmission means for driving the vehicle axle means, said distributor transmission means including a first side facing the driving engine and a second side facing away from the driving engine, said distributor transmission means being disposed at least approximately in at least one of said longitudinal center plane and said transverse center plane of the motor vehicle, said main transmission means being disposed on said second side of said distributor transmission means facing away from the driving engine, and means for permitting the subsequent installation of an auxiliary transmission means for very low speeds on said first side of said distributor transmission means facing the driving engine.

2. A multi-speed transmission arrangement for motor vehicles according to claim 1, wherein the motor vehicle is a tractor.

3. A multi-speed transmission arrangement according to claim 1, including an auxiliary transmission means, wherein said auxiliary transmission means includes means for permitting crawling and snail speeds.

4. A multi-speed transmission arrangement according to claim 1, including an auxiliary transmission means, wherein said distributor transmission means serves as a central oil sump means for said main transmission means and said auxiliary transmission means.

5. A multi-speed transmission arrangement according to claim 1, wherein said main transmission means includes a side facing said distributor transmission means and a side facing away from said distributor transmission means, and a main clutch means which is freely accessibly disposed on said side of said main transmission means facing away from said distributor transmission means.

6. A multi-speed transmission arrangement according to claim 5, wherein said main transmission means further includes a hollow input shaft operatively connected with said main clutch means, and wherein said means for operatively connecting the driving engine with said main transmission means includes a drive shaft extending through said hollow shaft, and wherein loose gear means are mounted on said hollow shaft, and means are provided for selectively coupling said loose gear means to said hollow shaft, one of said loose gear means serving for the forward drive and the other for the reverse drive.

7. A multi-speed transmission arrangement according to claim 6, wherein a shiftable planetary gear set means serving as a group gear is provided in said main transmission means, said planetary gear set means including an output shaft and wherein said distributor transmission means includes an input shaft operatively connected with said output shaft of said planetary gear set means.

8. A multi-speed transmission arrangement according to claim 7, wherein said main transmission means includes an output shaft, said planetary gear set means being aligned with said output shaft of the main transmission means.

9. A multi-speed transmission arrangement according to claim 8, wherein said output shaft of said planetary gear set means forms a part of an input means for said input shaft of said distributor transmission means.

10. A multi-speed transmission arrangement according to claim 9, wherein said output shaft of said planetary gear set means is operatively connected with said input shaft of said input means of said distributor transmission means.

11. A multi-speed transmission arrangement according to claim 9, wherein said output shaft of said planetary gear set means serves as said input shaft of said distributor transmission means.

12. A multi-speed transmission arrangement according to claim 9, including an auxiliary transmission means wherein said auxiliary transmission means includes an input shaft detachably connected with said input shaft of said distributor transmission means.

13. A multi-speed transmission arrangement according to claim 9, including an auxiliary transmission means having an output means, wherein said distributor transmission means includes a hollow shaft, and an input gear fixedly disposed on said hollow shaft, and wherein means are provided for selectively connecting said last-mentioned hollow shaft with at least one of said input shaft of said distributor transmission means and said output means of said auxiliary transmission means.

14. A multi-speed transmission arrangement according to claim 13, wherein said means for selectively connecting includes a sliding-tooth-clutch means disposed in said distributor transmission means between said hollow shaft and said input shaft of said distributor transmission means, said sliding-tooth-clutch means having at least a first and second shifting position, said sliding-tooth-clutch means being in continuous operative connection with said hollow shaft of said distributor transmission means in both of said shifting positions, said sliding tooth clutch means in said first position being operatively connected with said input shaft of said distributor transmission means and in said second shifting position with said output means of said auxiliary transmission means.

15. A multi-speed transmission arrangement according to claim 14, wherein means are provided for selectively connecting said input shaft of said auxiliary transmission means with said input shaft of said distributor transmission means, said last-mentioned means for selectively connecting includes a shifting sleeve means operatively connected with said sliding-tooth-clutch means.

16. A multi-speed transmission arrangement according to claim 15, wherein said shifting sleeve means is operatively connected with said sliding-tooth-clutch means in sequential actuation.

17. A multi-speed transmission arrangement according to claim 14, wherein at least a pair of vehicle axle means are provided and wherein said distributor transmission means includes a first output branch and a second output branch, one of said pair of vehicle axle means being continuously operatively connected to said second output branch, and wherein means are provided for selectively coupling the other of said pair of vehicle axle means with said first output branch, said output means being reversibly mounted in said distributor transmission means so that said means for selectively coupling said first branch is actuable either from the one side or the other side of said distributor transmission means.

18. A multi-speed transmission arrangement according to claim 17, wherein means are provided for selectively connecting said input shaft of said auxiliary transmission means with said input shaft of said distributor transmission means, said last-mentioned means for selectively connecting includes a shifting sleeve means operatively connected with said sliding-tooth-clutch means.

19. A multi-speed transmission arrangement according to claim 18, wherein said shifting sleeve means is operatively connected with said sliding-tooth-clutch means in sequential actuation.

20. A multi-speed transmission arrangement according to claim 14, wherein said distributor transmission means includes an output means, said output means including a first output branch and a second output branch, said second output branch being continuously connected with said vehicle axle means, and wherein means for selectively engaging said first branch with said vehicle axle means are provided and disposed at said first side of said distributor transmission means facing the driving engine and is actuable from said side.

21. A multi-speed transmission arrangement according to claim 20, wherein means are provided for selectively connecting said input shaft of said auxiliary transmission means with said input shaft of said distributor transmission means, said last-mentioned means for selectively connecting includes a shifting sleeve means operatively connected with said sliding-tooth-clutch means.

22. A multi-speed transmission arrangement according to claim 21, wherein said shifting sleeve means is operatively connected with said sliding-tooth-clutch means in sequential actuation.

23. A multi-speed transmission arrangement according to claim 14, including an auxiliary transmission means, wherein said distributor transmission means serves as a central oil sump means for said main transmission means and said auxiliary transmission means.

24. A multi-speed transmission according to claim 1, wherein a shiftable planetary gear set means serving as a group gear is provided in said main transmission means, said planetary gear set means including an output shaft and wherein said distributor transmission means includes an input shaft operatively connected with said output shaft of said planetary gear set means.

25. A multi-speed transmission arrangement according to claim 24, wherein said main transmission means includes an output shaft, said planetary gear set means being aligned with said output shaft of the main transmission means.

26. A multi-speed transmission arrangement according to claim 24, wherein said output shaft of said planetary gear set means forms a part of an input means for said input shaft of said distributor transmission means.

27. A multi-speed transmission arrangement according to claim 26, wherein said output shaft of said planetary gear set means serves as said input shaft of said distributor transmission means.

28. A multi-speed transmission arrangement according to claim 1, including an auxiliary transmission means wherein said auxiliary transmission means includes an input shaft detachably connected with said input shaft of said distributor transmission means.

29. A multi-speed transmission arrangement according to claim 26, wherein said output shaft of said planetary gear set means is operatively connected with said input shaft of said input means of said distributor transmission means.

30. A multi-speed transmission arrangement according to claim 29, including an auxiliary transmission means having an output means, wherein said distributor transmission means includes a hollow shaft, and an input gear fixedly disposed on said hollow shaft, and wherein means are provided for selectively connecting said last-mentioned hollow shaft with at least one of said input shaft of said distributor transmission means and said output means of said auxiliary transmission means.

31. A multi-speed transmission arrangement according to claim 30, wherein said means for selectively connecting includes a sliding-tooth-clutch means disposed in said distributor transmission means between said hollow shaft and said input shaft of said distributor transmission means, said sliding tooth clutch means having at least a first and second shifting position, said sliding-tooth-clutch means being in continuous operative connection with said hollow shaft of said distributor transmission means in both of said shifting positions, said sliding-tooth-clutch means in said first position being operatively connected in with said input shaft of said distributor transmission means and in said second shifting position with said output means of said auxiliary transmission means.

32. A multi-speed transmission arrangement according to claim 31, wherein means are provided for selectively connecting said input shaft of said auxiliary transmission means with said input shaft of said distributor transmission means, said last-mentioned means for selectively connecting includes a shifting sleeve means operatively connected with said sliding tooth clutch means.

33. A multi-speed transmission arrangement according to claim 1, wherein at least a pair of vehicle axle means are provided and wherein said distributor transmission means includes a first output branch and a second output branch, one of said pair of vehicle axle means being continuously operatively connected to said second output branch, and wherein means are provided for selectively coupling the other of said pair of vehicle axle means with said first output branch, said output means being reversibly mounted in said distributor transmission means so that said means for selectively coupling said first branch is actuable either from the one side or the other side of said distributor transmission means.

34. A multi-speed transmission arrangement according to claim 1, wherein said distributor transmission means includes an output means, said output means including a first output branch and a second output branch, said second output branch being continuously connected with said vehicle axle means, and wherein means for selectively engaging said first branch with said vehicle axle means are provided and disposed at said first side of said distributor transmission means facing the driving engine and is actuable from said side.

* * * * *